Nov. 13, 1934.  A. H. SIMPSON  1,980,934
VEHICLE SHOCK ABSORBING APPARATUS
Filed Jan. 6, 1932  2 Sheets-Sheet 1
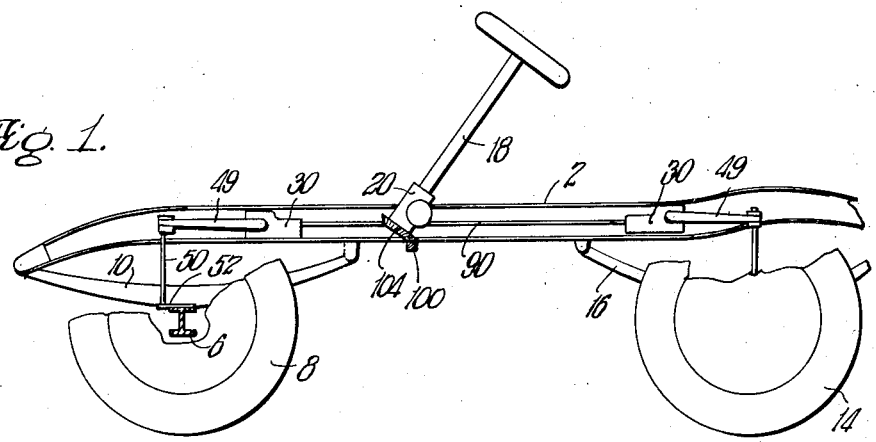

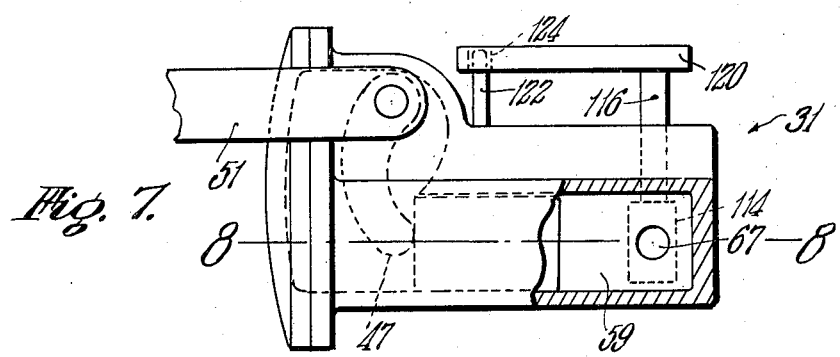
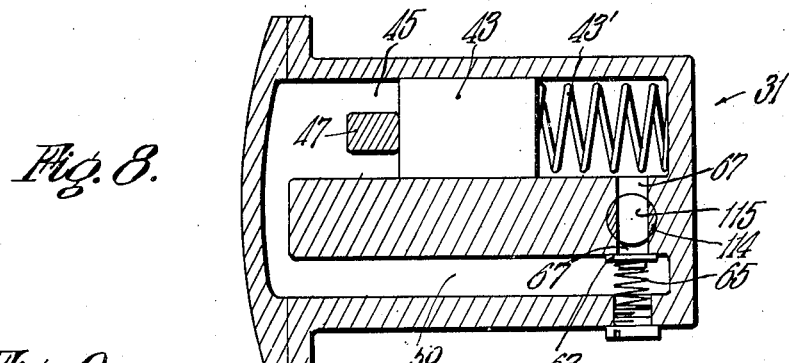
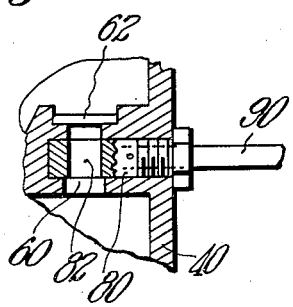

Patented Nov. 13, 1934

1,980,934

UNITED STATES PATENT OFFICE 1,980,934

VEHICLE SHOCK ABSORBING APPARATUS

Alden H. Simpson, Springfield, Mass.

Application January 6, 1932, Serial No. 585,025

2 Claims. (Cl. 188—88)

This invention relates to improvements in vehicle cushioning apparatus and is directed more particularly to improvements in cushioning apparatus for use in connection with automobiles and is adapted to prevent side swaying thereof.

The principal object of the invention is the provision of means for use in connection with an automobile to prevent side swaying of the frame as the car rounds corners and the like, and is accomplished by the provision of novel apparatus adapted to operate when it is desired to check the side swaying action.

According to a special feature of the invention I make use of a shock absorbing means commonly used with automobiles to check the same against side swaying. In one way the effect is accomplished as the car is steered around corners while in another way the effect is obtained by certain movements of the car itself.

Various novel features and advantages of the invention will be more fully hereinafter referred to in connection with the accompanying description of the preferred form of the invention taken in connection with the accompanying drawings wherein:

Fig. 1 is a partial side elevational and longitudinal sectional view showing so much of an automobile chassis as is necessary to explain the novel features of the invention.

Fig. 2 is a plan view of the same.

Fig. 3 is a partial side elevational and sectional view through a shock absorbing device such as used on automobiles and having incorporated therein certain features of the invention.

Fig. 4 is a transverse sectional view through the automobile chassis shown in Fig. 1 and Fig. 2 taken at the rear of the steering column.

Fig. 5 is a transverse sectional view through a shock absorbing device commonly used on an automobile and having a modified form of the invention associated therewith.

Fig. 6 is a plan view at a small scale of the device shown in Fig. 5.

Fig. 7 is a side elevational and sectional view of a shock absorbing device embodying the modification shown in Figs. 5 and 6.

Fig. 8 is a sectional view on the line 8—8 of Fig. 7, and

Fig. 9 is a fragmentary sectional view showing certain details of construction of the form of the invention shown in Fig. 3.

Referring now to the drawings more in detail the invention will be fully described.

In Figs. 1 and 2 there is shown an automobile chassis which may include a frame having side rails 2 which are suitably joined together by cross members 4. A front axle 6 has wheels 8 on opposite ends and springs such as 10 are connected to the axle and frame in the ordinary manner. A rear axle housing such as 12 extends across beneath the frame and is supported by wheels 14 and as usual springs 16 on top of the axle are suitably connected to the frame. These frames form no part of the invention and are merely shown to assist in the general understanding of the present invention.

A steering column or shaft 18 of usual form is shown which is supported in some suitable manner as by a housing 20 affixed to one of the side rails 2. This will be suitably connected to the forward wheels 8 whereby they may be steered in the usual manner by rotating the shaft 18 in one direction or the other.

Shock absorbers or cushioning devices 30 at the front or rear ends or to both ends of the chassis are secured to the opposite rails 2 and may be of any desired form. To assist in disclosing the invention one of the devices 30 is more clearly shown in Fig. 3. Each device may include an outer case or shell 40 having a piston 42 reciprocable in a suitable bore or compression chamber 44 so as to act on a fluid within the chamber. A shaft 46 is oscillatable in the casing 40 and an actuating lever 48 is provided for bearing on the piston 42.

A lever 49 on shaft 46 has its outer end connected as by a rod 50 to a bracket 52 affixed to the axle 6. The shock absorbers 30 at the rear of the vehicle are similarly constructed and connected to the rear axle 12.

Disposed in the compression chamber 44 is a compression spring 54 against which the piston acts as the levers 48 and 49 move in a counterclockwise direction. A reservoir 58 for fluid is provided in the shock absorber and a port or passageway 60 is in communication with the compression chamber and reservoir. A valve 62 is yieldingly urged against a suitable seat by a spring 64 to close the port 60 and the tension of the spring is usually variable by an adjusting screw 66 above the spring.

As the frame moves upwardly relative to the axles the levers 49 are moved counterclockwise so that the levers 48 act on the pistons which in turn act on the fluid in the compression chamber 44. According to the tension of the springs 54 the liquid in the compression chamber is restricted against flowing through the port 60 whereby the movement of the pistons is cushioned and naturally there is a cushioning action to more or less retard movements of the frame relative to the axles. Such a construction as has been described is usually common with all hydraulic shock absorbers or cushioning devices and of course there may be another piston and compression chamber with its valve employed in each shock absorber where it is desired to check both up and down movements of the frame relative to the axle.

After the piston has moved to the right for the checking action it is returned to the left by the spring 54 at a somewhat slower speed and fluid passes by the piston into the chamber 44. In this way the chamber at all times contains sufficient fluid for the checking action.

According to this invention I provide in the port 60 a valve to control the flow of liquid through the port. This valve may be of any desired form but in the embodiment shown it consists of a cylindrical plug member oscillatable in the port 60 and it has a port 82 therethrough.

This valve 80 may be oscillated so that its port 82 may register with the port 60 or in another position it may close the port 60 entirely. When out of register the piston 42 may not move forwardly and in that way the relative movement of the frame and axle will be checked.

As the automobile rounds corners there is a natural tendency for the frame to tilt and sway relative to the axle. According to this invention I aim to prevent movements of the frame relative to the axle as the automobile rounds corners and thereby obviate the tilting and swaying. To accomplish this the valves 80 are provided in the ports of the shock absorbers on both sides of the frame, and as the vehicle rounds corners the valves are moved to close off the ports. When the ports are closed off the frame and axle are held against relative movements because the pistons are checked against movement as has been explained.

For instance, when the automobile rounds a curve in one direction the apparatus may be arranged so that the port of the shock absorber on one or both sides are closed off. This will prevent a raising movement of one or both sides of the frame relative to the axle. In a broad way it is intended to close the ports at such times as the automobile rounds curves so as to prevent the absorbers from acting as cushioning devices and in that way the frame and axle are held against relative movements which produce the objectionable tilting and side swaying.

The valves 80 are positively operated as the car rounds the corners by means of the following: Rods such as 90 are located adjacent or within the rails 2 as shown in Figs. 1 and 4 and may be connected to the valves 80 of the absorbers located at the forward and rear end of the frame. The ends of the rods 90 are oscillatable in and extend through suitable packing devices 91 such as shown in Fig. 3 and are fixed to the valves 80, whereby the valves are oscillated by the rods. Levers 92 may be fixed to the rods 90 and have depending forked portions 93 which loosely embrace a transverse rod 100 which is slidable in brackets 102 affixed to the rail members 2. The steering column 18 may carry on its lower end a gear 104 which meshes with teeth on the rod 100. Collars 110 on the rod 100 may be employed to engage the levers 92.

As the steering column is turned to steer the automobile the rod 100 will be moved transversely of the frame so that one or both of the levers 92 will be moved to rotate a rod or rods 90 and bring the valves 80 into or out of register with the ports 60 between the compression chambers and reservoirs of the absorbers.

Various mechanisms may be employed in lieu of what is shown so that the steering column will actuate the valves 80 and the parts may be arranged so that as the car is steered for a right or left turn the valves of the shock absorbers on one or the other sides of the frame may be operated. Altogether the mechanism may take various forms to accomplish the purpose so long as the operator by turning the steering column may positively actuate certain of the valves for the purposes mentioned.

According to the modification of the invention shown in Figs. 5 to 8, inclusive, a shock absorber 31 is indicated which has a piston 43 slidable in a chamber 45 actuated by a lever 47 associated with a lever 51. A valve 63 is spring pressed by a spring 65 to yieldingly close a port 67 between the compression chamber 45 and a reservoir 59. A spring 43' is disposed in the chamber 45 behind the piston 43.

In this form of the invention a cylindrical valve 114 is rotatable in the port 67 and has a port 115 therethrough so that the valve may be turned to register with the port or to cut off communication between the compression chamber and reservoir.

A stem 116 of the valve 114 extends upwardly and preferably on a vertical axis and carries on its upper end a weight 120. Fig. 6 illustrates the shock absorber as being mounted on the left rear side of the frame. The arrow shows the direction of movement of the frame. The weight 120 is so arranged that when the automobile rounds a curve it will tend to swing in one direction or the other and in that way causes the valve to rotate. By this means the action of the shock absorber is controlled automatically by the position of the weight and will be desirable since it is not necessary to connect the valve so that it will be operated by the steering column.

When the automobile assumes a straight course after rounding a corner and the weight being at a side of the axis of stem 116, the weight is caused to swing into a position where the main portion thereof is fore or aft of the said axis and opens the valve. This is the normal position of the valve and weight when the automobile is traveling a straight course.

The weight tends to assume the normal position because it is disposed behind the axis of the stem as shown in Fig. 6 and therefore has a tendency to align with the stem when the automobile is traveling in a straight course.

A pin 122 may extend upwardly from the shock absorber and work in an elongated slot 124 of the weight to limit the movement of the weight and the movements of the valve 114.

The apparatus may be varied within wide limits without departing from the spirit and scope of the invention, and therefore it is desired not to be limited to the specific form of the invention shown, but rather if at all to the appended claims, and therefore what I desire to secure by Letters Patent of the United States is:

1. The combination of relatively movable frame and axle members of an automobile with means for checking relative movements thereof as the frame sways when the automobile departs from a normally straight course comprising, a unitary device including a body having a fluid chamber and a reservoir separate therefrom connected thereto at one end and a port connecting said chamber and reservoir at their opposite ends, a piston reciprocable in the chamber, a valve rotatable in the body passing through said port provided with an opening therethrough disposed in said port and having a stem part extending upwardly from the body, an actuating member fixed to said stem having a weighted part disposed at a side of the axis of rotation of the valve for swinging in a horizontal plane, and connections between the frame, axle and piston to bring about reciprocation of the piston as the frame and axle move relative to one another, all adapted and arranged whereby the said actuating member is moved in a horizontal plane as the frame moves sideways relative to the axle when the automobile departs from a normally straight path to rotate said valve on its vertical axis and change the position of the opening therethrough relative to the port and thereby control the flow of fluid between the chamber and reservoir.

2. The combination of relatively movable frame and axle members of an automobile with means for checking relative movements thereof as the frame sways when the automobile departs from a normally straight course comprising, a unitary device including a body having a fluid chamber and a reservoir separate therefrom connected thereto at one end and a port connecting said chamber and reservoir at their opposite ends, a piston reciprocable in the chamber, a valve rotatable in the body passing through said port provided with an opening therethrough disposed in said port and having a stem part extending upwardly from the body, an actuating member fixed to said stem having a weighted part disposed at a side of the axis of rotation of the valve for swinging in a horizontal plane, a spring pressed valve associated with the port between said port and reservoir, means to limit the swinging movements of said actuating member, and connections between the frame, axle and piston to bring about reciprocation of the piston as the frame and axle move relative to one another, all adapted and arranged whereby the said actuating member is moved in a horizontal plane as the frame moves sideways relative to the axle when the automobile departs from a normally straight path to rotate said valve on its vertical axis and change the position of the opening therethrough relative to the port and thereby control the flow of fluid between the chamber and reservoir.

ALDEN H. SIMPSON.